United States Patent [19]
Tozer

[11] 3,879,043
[45] Apr. 22, 1975

[54] SEALING MEANS
[75] Inventor: Michael John Caswell Tozer, Stocksfield, England
[73] Assignee: The Corrugated Packing and Sheet Metal Company Limited, Newcastle upon Tyne, England
[22] Filed: Apr. 12, 1973
[21] Appl. No.: 350,351

[30] Foreign Application Priority Data
Apr. 14, 1972 United Kingdom............. 17458/72

[52] U.S. Cl. .............. 277/163; 277/170; 277/205; 277/213
[51] Int. Cl.............................................. F16j 9/06
[58] Field of Search........ 277/157, 163, 205, 206 R, 277/213, 236, 170

[56] References Cited
UNITED STATES PATENTS
3,129,021 4/1964 Willis et al...................... 277/205 X
3,272,521 9/1966 McNenny ......................... 277/205
3,575,432 4/1971 Taylor............................ 277/206 R
3,588,131 6/1971 Nicholson........................ 277/236

Primary Examiner—Samuel B. Rothberg
Attorney, Agent, or Firm—Marn & Jangarathis

[57] ABSTRACT

A means for sealing a joint between a pair of mating surfaces and of the kind of which in plan view is of closed profile, that is to say for instance of annular or rectangular shape — is proposed to have a hollow wall of "C" cross-section. The ends of the "C" are continued towards each other and are then turned inwardly within the confines of the "C" and subsequently away from each other. In this manner upper and lower terminal positions of substantially U-shape vertical section are provided and such a construction contributes to the efficiency of the seal which is obtained.

10 Claims, 11 Drawing Figures

SEALING MEANS

This invention relates to means for sealing a joint between a pair of mating surfaces and of the kind which in plan view is of closed profile, by being for instance of annular or rectangular shape.

According to the present invention, there is provided sealing means of this kind having a hollow wall of C-shaped cross-section, the ends of the C being continued towards each other and then being turned inwardly within the confines of the C and subsequently away from each other, thereby providing upper and lower terminal portions of substantially U-shape in vertical section.

Depending upon the application of the sealing means, adjacent parts of the upper and lower terminal portions may be arranged to abut one another, for example at the central horizontal plane of the means. In such a case it may be found preferable to provide small undulations or grooves in the abutting part of at least one of the terminal portions, whereby pressurised fluid flowing between the surfaces being sealed can readily enter the confines of the C and augment the sealing of the means against said surfaces.

In one embodiment of the invention, a plurality of substantially axial slots are formed in the upper and lower, inwardly facing portions of the means, thereby forming a plurality of fingers which increase the flexibility of the means.

The flexibility may be further increased by locating within the means a spring of C-shape in vertical section which spring may be provided with a plurality of upper and lower, substantially axial slots. Alternatively a pair of helical springs could be located, one in the upper and one in the lower regions of the means.

By way of examples only, embodiments of the invention will now be described in greater detail with reference to the accompanying drawings of which FIG. 1 is a vertical section of one embodiment of the present invention, FIG. 2 is a vertical section of a modification of the embodiment of FIG. 1, FIGS. 3 to 6 are vertical sections of further modifications of the embodiment of FIG. 1.

Figure 1:
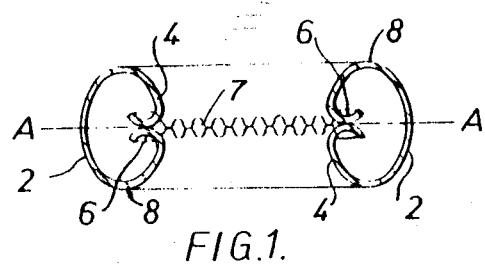

Referring to the drawings, the hollow walled annular seal of FIG. 1 is of substantially C-shape in vertical radial section having a radially outwardly facing wall part 2, the two end portions 4 of which are continued substantially axially of the seal towards the central horizontal plane A thereof, are then turned inwards of the C into the confines of the wall part and are finally turned axially outwards for a short distance. Thus a pair of substantially U-section terminal portions 6 are formed, one to each side of the central horizontal plane A. In FIG. 1, the two terminal portions 4 are illustrated abutting one another at said horizontal plane, this being a preferred but not essential arrangement of the invention.

Terminal portions as detailed above provide two particular advantages — greater contact pressure on the mating faces, thereby increasing the sealing properties compared with basic C-section seals not having the additional support provided by said terminal portions 6, and, consequently, a lighter structure of seal providing greater flexibility than heretofore.

It is preferable, wherever possible, to utilise the pressurised fluid flowing between a pair of sealed parts to assist in the sealing of said parts. Thus said fluid should be allowed to flow into the confines of the wall part 2 of the seal. When the terminal portions 6 abut one another, therefore, it is advisable to provide slight undulations or grooves 7 in the contacting surfaces of said portions 6, or, alternatively or additionally, to provide holes in the inner wall parts 4 of the seal. With such an arrangement, the sealing regions 8 of the seal engage with their associated surfaces with increased pressure.

In high-pressure conditions, or in weak structures, it is possible that bowing of the mating flanges to be sealed may occur. A similar situation can arise through pulsating pressure, and parting of the mating faces may even occur during pressure cycling.

Figure 2:
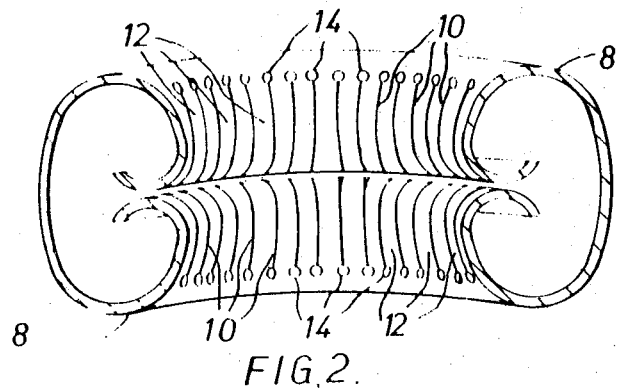

Such conditions necessitate a seal of high flexibility. This flexibility can be further improved by providing the seal, as shown in FIG. 2 with a plurality of substantially axial slots 10 cut in its inner faces 4 to provide a plurality of fingers 12 which can mould the contacting regions 8 of the seal to the shape of the mating surfaces. It is preferable to provide a small hole 14 for each slot to run into, thus reducing the possibility of cracking.

This type of seal must be subjected to a controlled compression on sealing, and this can be achieved by locating the seal in a recess of predetermined depth in one of the components to be sealed. Alternatively, the seal could be located in a compression control ring.

Such a seal should be springy in order to maintain its good recovery value, but its hardness can vary and the contacting regions 8 may have relatively poor cold flow characteristics. In order to overcome this, and to ensure that any surface asperity or irregularity is filled, the seal is faced with a soft coating of, for example, silver, aluminium, gold, polytetrafluorethylene, rubber or the like.

Figure 3:
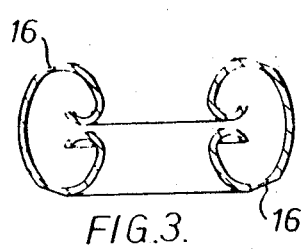
Figure 4:
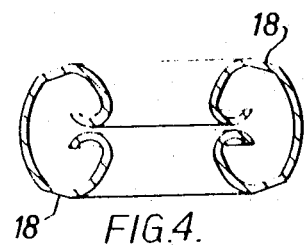

In conditions where a seal is to be located between mating faces having, for example, a very heavy machining chord, it is preferable for the seal to have as large a contacting area 8 as possible. FIGS. 3 and 4 show two alternative ways of providing such an increase in the area 8. Thus FIG. 3 shows a flat 16 lapped, ground or machined on the outer sealing areas of the seal, while FIG. 4 shows a flat 18 pressed into the material of the seal to replace the equivalent arcuate portion of FIG. 1. Conveniently the flats 16, 18 are at a slight angle to the horizontal so that, after compression of the seal and in use, they are horizontal and parallel with the mating surfaces.

Figure 5:
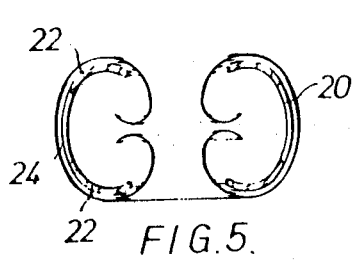
Figure 6:
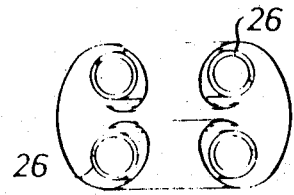

As shown in FIG. 5, the flexibility of the seal can be further increased by locating a C-section spring 20 within the seal. This spring may have an upper and lower series of axial slots forming two series of fingers 22, each series defining between them a central portion 24. Again each slot may terminate in a small hole to prevent cracking. Alternatively a pair of helical springs 26 (FIG. 6) could be located, one within the upper region, and one within the lower region, of the seal.

Such a seal will be costly to produce in a one piece construction, and for economical reasons therefore it may be found preferable to manufacture by, for example, welding together circumferentially two prefabricated halves, or, alternatively, butt-welding a rolled section.

Figure 7:
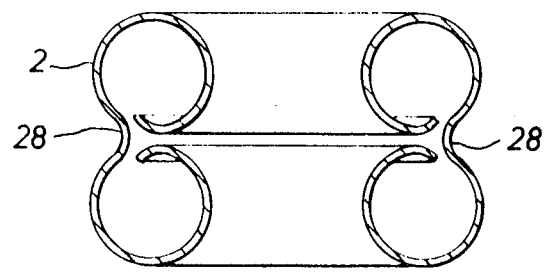
FIG. 7 is a vertical section of another embodiment of the present invention.

In very heavy industry where it is difficult to obtain recesses whose depth is accurately machined, it is often necessary to cope with a much greater or lesser compression of the seal than would otherwise be expected. In order to overcome this difficulty it is advisable to provide a seal as shown in FIG. 7 in which the body part 2 is bowed inwards at 28, thus preventing the soft sealing surface being scrubbed off during any extreme rolling action of the seal which may occur because of excessive compression. This bowing should only be necessary in seals of large section.

Figure 8:
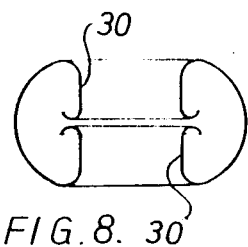
FIG. 8 is a vertical section of still another embodiment of the present invention.

If there is limited space in which to locate the seal of the invention, the radial width of the seal could be reduced as in FIG. 8 where the heretofore bulbous portions 4 have a substantially cylindrical formation as shown at 30.

Figure 9:
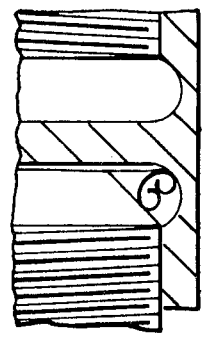
FIGS. 9 and 10 are partial vertical sectional views of the present invention in rotated forms.

FIG. 9 illustrates a seal turned through 45° compared with earlier seals, for angular sealing such as may be required with a screwed connector or union.

Figure 10:
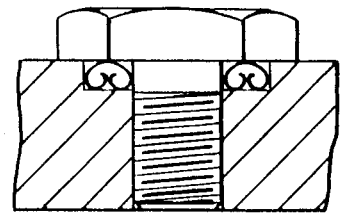

FIG. 10 illustrates a seal turned through 90° compared with those of FIGS. 1 to 8, such a seal being suitable for shaft sealing.

Figure 11:
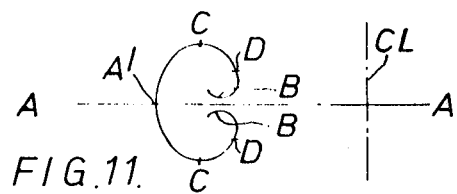
FIG. 11 is a schematic illustration of the operation of the present invention.

Referring now to the diagrammatic FIG. 11, when the seal is axially compressed the following conditions and operational features apply:

Under initial slight compression, bending about point A' in the horizontal plane A takes place. The initial area of contact in the region C tends to move axially inwards towards the vertical centre-line CL of the seal. This movement is resisted by the circumferential hoop stress and the resistance gradually increases as the seal is further compressed. During the further compression the contact point C moves on the seal along the arc CA' towards point A'.

When the seal is compressed to the extent that points B,B abut each other further bending in the upper and lower U sections of the seal take place about points D,D. Resistance to further compression by the bending about D,D takes place in addition to resistance to bending about point A so that there are essentially 3 resilient springs in action one from the C-type section and two from the U type sections within the C.

By this means great flexibility and resilience of the sealing means is achieved in addition to high sealing loads at sealing contact points C,C. By the complex combination of the three springs a light, strong resilient seal can be achieved in a minimum of space.

Although the drawings illustrate seals of annular shape, it will be appreciated that any closed profile, whether arcuate, rectangular, undulating or the like, can be provided.

Although described as having inwardly-directed C-section to seal internal pressures, the seal of the invention may be turned through 180° to provide an outwardly-directed C-section for vacuum applications.

Suitable selection of material and/or coating enables the seal of the invention to be used under any conditions of temperature, pressure and so forth.

Thus the invention provides a seal which need only be subjected to a low clamp load, which has great flexibility in conjunction with self-energising properties and which has a very high recovery factor.

I claim:

1. A sealing element for the purpose and of the kind referred to which is comprised of a wall of C-shaped cross-section forming a hollow section, end portions of the C shaped wall continuing towards each other and thence inwardly within the confines of the C-shaped wall and subsequently diverging apart from each other thereby providing upper and lower substantially U-shaped terminal segments.

2. A sealing element in accordance with claim 1 wherein said upper and lower terminal segments are formed with adjacent parts which abut one another with at least one of said adjacent parts being formed with undulations or grooves whereby fluid under pressure flow between surfaces being sealed is permitted to readily enter within said hollow wall to augment the sealing of the sealing element against said surfaces.

3. A sealing element in accordance with claim 1 wherein a plurality of substantially axial slots are formed in the upper and lower inwardly facing portions of said wall.

4. A sealing element in accordance with claim 1 wherein a C-shaped spring is disposed within said C-shaped wall.

5. A sealing element in accordance with claim 4 wherein said C-shaped spring is formed with an upper and a lower series of finger-defining axial slots.

6. A sealing element in accordance with claim 1 wherein a helical spring is provided in each of the upper and lower regions of said C-shaped wall.

7. A sealing element in accordance with claim 1 wherein said wall is bowed inwardly towards the terminal portions thereof.

8. A sealing element in accordance with claim 1 wherein said terminal segments are substantially cylindrically-shaped.

9. A sealing element in accordance with claim 1 wherein said C-shaped wall is inclined outwardly relative to a central axis of symmetry of said element.

10. A sealing element in accordance with claim 1 wherein the face of said C-shaped wall is parallel to the central axis of said element.

* * * * *